Dec. 2, 1969     W. H. IHLENBURG     3,481,793
SINGLE FILL BATTERY
Filed Feb. 13, 1968     3 Sheets-Sheet 1
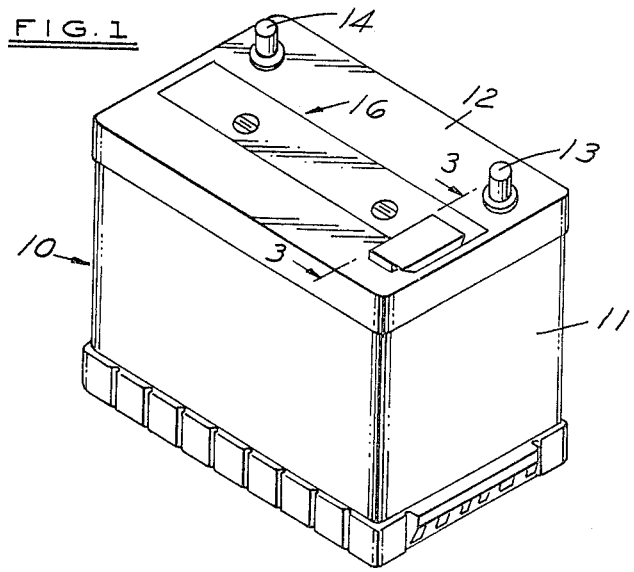
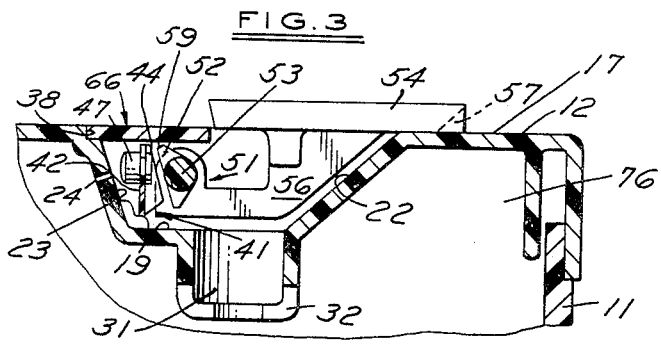
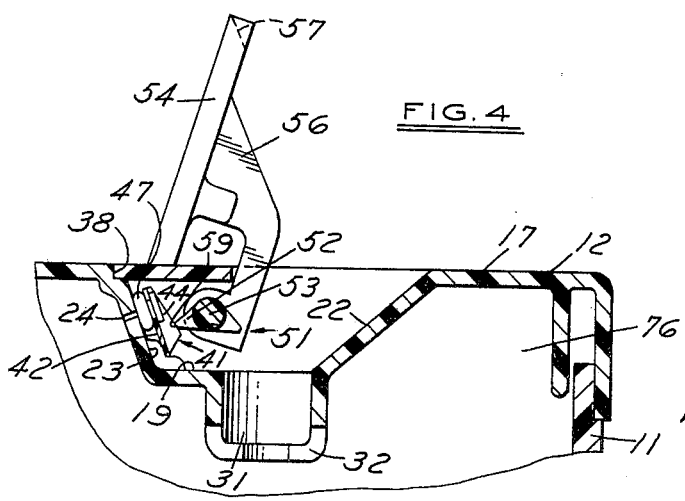
INVENTOR
WILLIBALD H. IHLENBURG
BY John R. Faulkner
William E. Johnson
ATTORNEYS

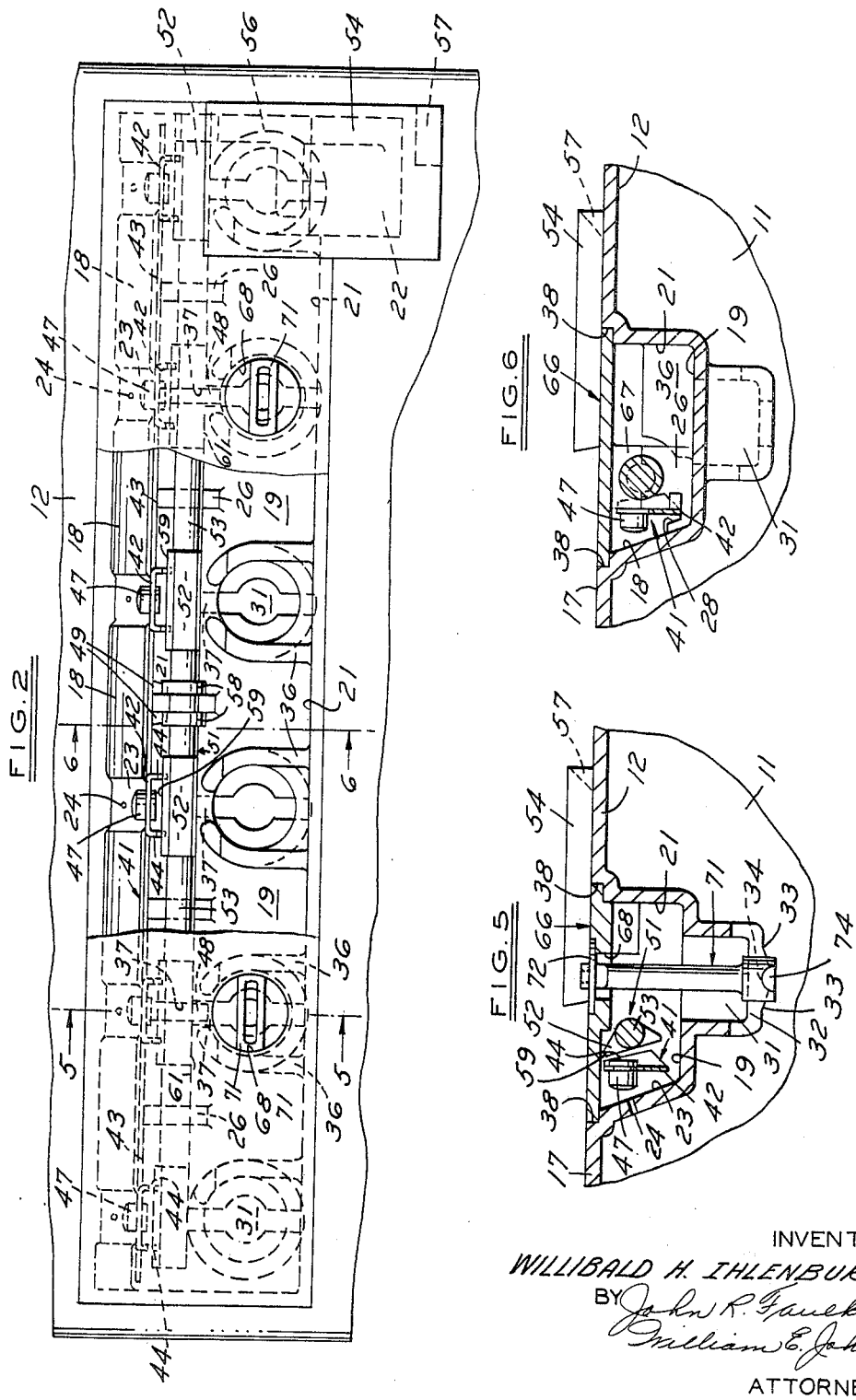

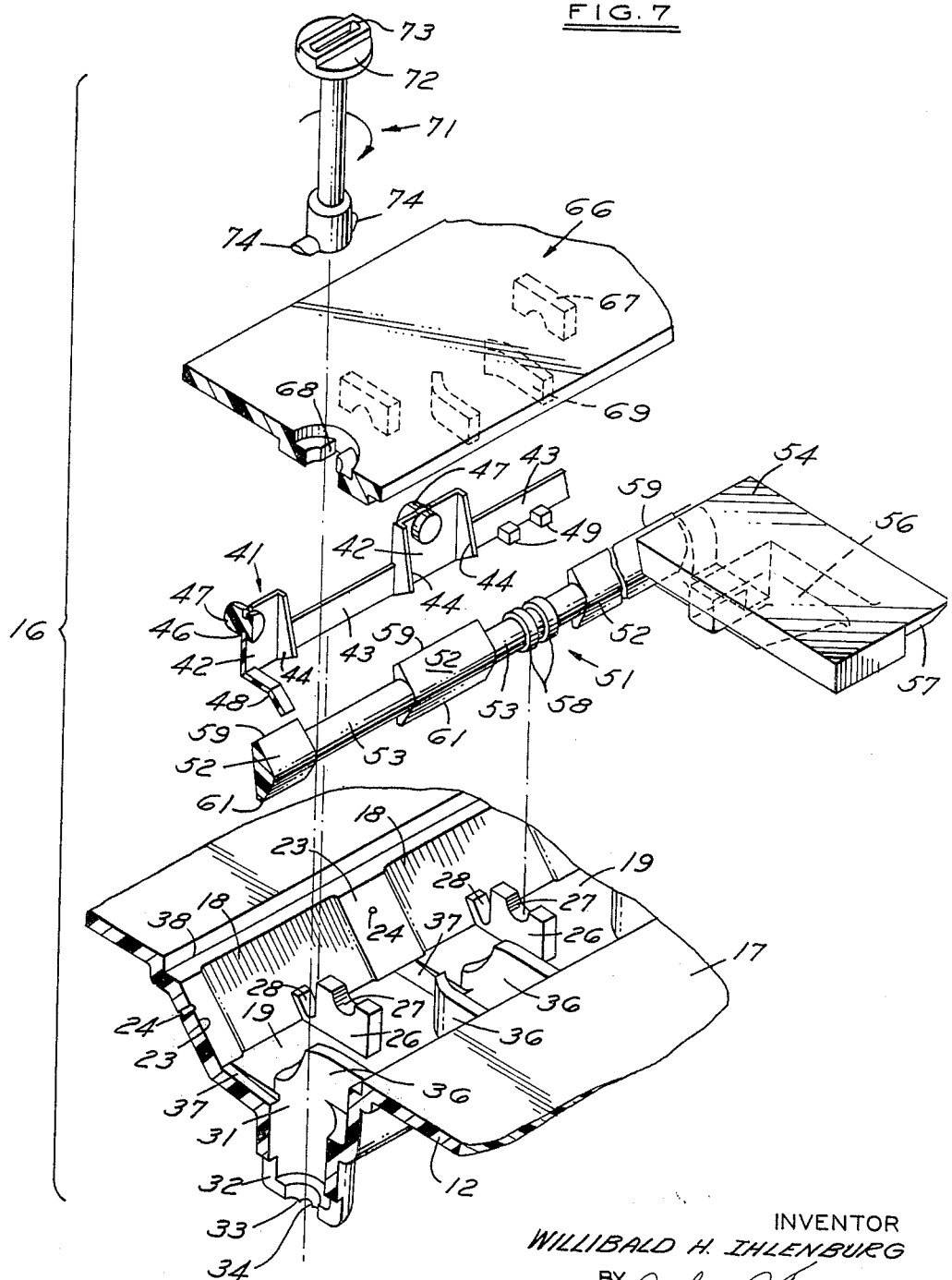

A flapper is located between
the sidewall and the camming member and is pivotably
received in notches formed in the bearing support members. The flapper has both cam surfaces therealong and
deformable buttons thereon positioned adjacent the air
escapement vents in the sidewall of the recess. A plate
covers the recess in the battery cover and caries a plurality of members defining bearing surfaces which cooperate with the bearing support members extending upwardly
from the bottom of the recess to mount the camming
member for rotative movement therebetween. A camming member actuating device is provided for moving
the camming member between two positions.

When the camming member actuating device is in a
first position, the cams of the camming member engage
the cam surfaces of the flapper to move the deformable
buttons of the flapper into sealing engagement with the
associated ones of the air escapement vents of the recess's
sidewall. When the filling structure of the battery is in
such a position, fluid may be added to the respective cells
through the filler wells associated with each cell. The
added fluid fills the first cell up to the level of the filler
well's bottom ring. Thereupon, the fluid entraps air in the
cell and the fluid then overflows and fills the next cell of
the battery. Each of the cells plus the entire cover recess
and all of the wells are thus filled against the pressure of
air entrapped in each cell. When the camming member
actuating device is moved to the second position, the cams
are moved out of engagement with the cam surfaces of
the flapper whereby the deformable buttons are no longer
forced into sealing relationship with the air escapement
vents associated with each cell. When the air escapement
vents are open, each cell is vented thereby permittiing the
fluid contained within the filler wells and the cover recess
to flow out and into the cells to achieve a uniform and
proper electrolyte level throughout the cell.

The battery of this invention may be rapidly and efficiently serviced so as to maintain the proper level of electrolyte fluid within the individual cells of the battery.
Only a single member must be actuated to service the
battery rather than requiring the removal of a plurality
of individual cell closure members for battery service.
With such a battery, service station attendants will be
more apt to check the battery thereby insuring that the
service performance ability of the battery will be consantly maintained at a high operating level.

BRIEF DESCRIPTION OF THE DRAWINGS

FIGURE 1 is an isometric view of a battery which incorporates the single fill structure of this invention. FIGURE 2 is a plan view shownig a portion of the top surface
of the battery of FIGURE 1 and incorporates details of
the single fill battery structure. FIGURE 3 is a view
taken along line 3—3 of FIGURE 1 showing the structure
in a position for normal battery utilization. FIGURE 4
is a view similar to FIGURE 3 showing the structure in a
position permitting the addition of fluid to the cells of the
battery. FIGURE 5 is a view taken along line 5—5 of
FIGURE 2 showing the manner of securing the various
structural components together. FIGURE 6 is a view
taken along line 6—6 of FIGURE 2 showing the position
of various components of the single fill structure in a
normal battery operating position. FIGURE 7 is an isometric exploded view showing a portion of the structure
in a disassembled condition.

DESCRIPTION OF THE PREFERRED
EMBODIMENT

Construction

In FIGURE 1 there is seen a battery, generally designated by the numeral 10, which is formed of a battery case 11 and a case cover 12 from which positive and negative poles 13 and 14, respectively, extend. As is well known in the art, the case cover 12 and compartment walls of the battery case 11 have intermeshing parts which form individual cell compartments within the battery when the case and cover are assembled. In 12 volt battery structures used for automobiles, there are six cell compartments in which the various battery plates are supported. Since such battery structures are well known, as typified by the structure shown in U.S. Patent 3,309,232, issued on March 14, 1967, no further explanation of the cooperation of the case 11 and cover 12 will be made herein. It should be understood, however, that the following description will be of a preferred battery having six cell compartments.

The battery 10 shown in FIGURE 1 also has associated therewith the single fill structure of this invention, generally designated by the numeral 16. The single fill structure 16 is shown in FIGURE 2 in plan view and in FIGURE 7 in exploded view. The FIGURES 3 through 6 are views taken at various positions so as to show the single fill structure in operating position. In the remaining description, principle reference will be to FIGURES 2 and 7.

The case cover 12 associated with the single fill structure 16 is a modified case cover in that special provisions are made therein such that the cover cooperates with other elements of the single fill structure. More particularly, the battery case cover 12 is formed such that the top surface 17 thereof has a recess formed therein. The recess in the cover is formed, in its preferred embodiment, by an inclined sidewall 18 (best seen in FIGURES 6 and 7), a bottom wall 19 and a substantially vertical sidewall 21 (best seen in FIGURES 5 and 6). The walls 18, 19 and 21 run the entire length of the top of the case cover 12 except that at the right-hand side of the case cover 12, as viewed in FIGURE 1, the vertical sidewall 21 is ended and an inclined sidewall 22 is substituted so as to accommodate the actuating component of the single fill battery structure. The inclined sidewall 22 and its relationship to the other elements of the structure are best seen in FIGURE 3.

Along the length of the inclined sidewall 18, are a plurality of raised plateaus 23. A plateau 23 is associated with each one of the six cells of the battery of the preferred embodiment. Each plateau 23 has a small air escapement vent 24, which vent provides an opening from each cell for permitting air entrapped in the cell to be vented when the vent is open.

Along the bottom wall 19 of the battery case cover 12, are a plurality of bearing support members 26, best seen in FIGURE 7. Each of the bearing support members 26 has a semicircular aperture 27 which serves as a portion of a bearing for a component of the single fill structure which will be described in deatil in a subsequent portion of this specification. Bearing support members 26 also have notched-out portions 28 thereof located intermediate the inclined wall 18 and the semicircular aperture 27. The purpose of the notched-out portions 28 will also be described in more detail in a subsequent portion of this specification.

The bottom wall 19 of the battery case cover 12 also has associated therewith a plurality of filler wells 31, a single filler well being associated with and extending downwardly into each of the cells of the battery. The filler wells 31 provide openings to the cells through which fluid may be supplied to individual ones of the battery cells.

In accordance with detailed teachings of this invention, the second filler well 31 from each end of the recess in the battery case cover 12 is modified in a manner such as shown in FIGURES 5 and 7. More particularly, the bottom portion 32 of the well extending into the cell is formed to have a cam surface 33 and a semicircular notch 34. The purpose of modifying these two filler wells will be described in detail in a subsequent portion of this specification.

The bottom wall 19 of the battery case cover 12 supports a plurality of upstanding splash guards 36. The splash guards are formed in cooperating pairs about each of the wells 31, and they act to reduce the splashing of battery electrolyte from the individual cells.

The bottom wall 19 of the battery case cover 12 has a plurality of ramps 37, each ramp being inclined from one of the plateaus 23 toward a terminal position between a pair of spaced splash guards 36 formed about an associated one of the filler wells 31. The ramps 37 permit fluid poured into the recess of the battery case cover to flow easily from the channel formed by the walls 18, 19 and 21 into the cells communicating with each of the wells 31.

A stepped-out area 38 is provided around all of the lateral edges of the top surface 17 of the battery case cover 12 for a purpose which will be described subsequently.

The battery case cover 12 may be formed in a single molding operation utilizing a material such as polypropylene. The air escapement vents 24 may be drilled in the plateaus 23 after the battery case cover 12 has been formed or if a more elaborate molding process is desired, the vents 24 may be formed during the molding operation. This completes the description of the battery case cover 12 utilized in conjunction with the single fill battery structure of this invention. Attention will now be directed to the other components of the single fill structure and their interrelationship with the case cover 12.

The second major component of the single fill structure 16 is a flapper, generally designated by the numeral 41 and best seen in FIGURE 7. The main portion of the flapper 41 is formed in a single molding operation and comprises a plurality of upstanding portion 42 linked together by a plurality of interconnecting webs 43. In the preferred embodiment of the flapper, each portion 42 has on each of the sides thereof adjacent the interconnecting webs 43 a raised cam surface 44. The purpose of these cam surfaces 44 will be described in detail subsequently. Each of the upstanding portions 42 also has an opening 46 therein, shown in FIGURE 7. Each of the openings 46 receives therein a deformable button 47 made of a material such as rubber. The flapper also has associated therewith two backcams 48, only one being shown in FIGURE 7 and a pair of locating members 49.

The flapper 41 is assembled with the case cover 12 by positioning the interconnecting webs 43 of the flapper in the notched-out portions 28 of the bearing support members 26. More particularly, the locating members 49 on the one interconnecting web of the flapper are received on either side of the central bearing support member 26, shown best in FIGURE 2. This locates the flapper in such a position that the other interconnecting webs thereof are received in the notched-out portions of respective ones of the bearing support members.

The positioning of the locating members 49 with respect to the central one of the bearing support members 26 also locates the backcams 48 of the flapper 41 in the ramps 37 associated with the second filler well 31 from each end of the recess in the case cover 12 of the battery. This is best seen in FIGURE 2 and may also be appreciated from viewing FIGURE 7. When the flapper is in its assembled position, each of the deformable buttons 47 supported thereby is in an aligned relationship with a respective one of the air escapement vents 24 located on each of the plateaus 23 associated with each of the cells of the battery.

Having described the flapper 41, the description will now be directed to the third component of the single fill structure of this invention, namely, a camming member, generally designated by the numeral 51 and best seen in FIGURE 7. The camming member is formed so as to have a plurality of cams 52 interconnected by spacing shafts 53. At the right end of the battery structure, as viewed in FIGURES 1, 2 and 7, the camming member 51 is interconnected to a closure structure 54 by way of an interconnecting web 56. The closure structure 54 also has a recess portion 57 to aid in the manual operation of the structure.

One of the spacing shafts 53 of the camming member 51 has a pair of raised circular locating members 58 associated therewith, as seen in FIGURE 7. The camming member is assembled with the battery case cover 12 by positioning the raised circular locating members 58 on either side of the central bearing support member 26 while the surface of the spacing shaft therebetween is positioned in the semicircular aperture 27 of the support member 26, shown best in FIGURE 2. By such location, the other spacing shafts 53 are likewise located in associated ones of the semicircular apertures 27 of the various bearing support members 26. The members 26 thus provide bearing surfaces upon which the camming member 51 may be rotated when the closure structure 54 is pivoted upwardly from the top surface 17 of the battery case cover 12. As is best seen in FIGURE 3, when the camming member 51 is assembled with the battery case cover 12, the interconnecting web 56 between the camming member 51 and the closure structure 54 is received in the recess of the case cover between the plateau 23 of the inclined sidewall 18 and the sidewall 22.

When in its assembled condition, the camming member 51 is located such that the top surfaces 59 of each of the cams 52 extend across the width of each of the upstanding portions 42 of the flapper 41. The cams 52 are thereby in proximity to the raised cam surfaces 44 of each of the upstanding portions. Also, the bottom surface 61 of two of the cams 52 are in contact with the two backcams 48. When contact is formed between the backcams and these surfaces, the flapper 41 is held in a position whereat the buttons 47 are spaced from respective ones of the air escapement vents 24. This particular position is illustrated in FIGURES 3, 5 and 6 in which the flapper 41 and the camming member 51 are in an unoperated position occupied during normal battery use.

Attention is now directed to the fourth component of the single fill battery structure of this invention, namely, a cover plate, generally designated by the numeral 66 in FIGURE 7. This plate may be made out of any suitable plastic material but is preferably a translucent plastic such that the various filler wells 31 are visible to a person examining the top surface 17 of the battery 10. The cover plate 66 has, as best seen in FIGURE 7, a plurality of depending bearing support members 67 equal in number and spaced in accordance with the spacing of the bearing support members 26 associated with the bottom surface 19 of the case cover 12. The cover plate also has therein openings 68 which have a key type form. The right-hand end of the cover plate is notched-out such that the closure structure 54 may be received therein.

The cover plate 66 is secured to the battery case cover 12, and the various components such as the flapper 41 and the camming member 51 are secured within the structure by means of a pair of fasteners, generally designated by the numeral 71. A top portion 72 of the fastener 71 is formed in a circular configuration but is slightly bowed at the outside edges downwardly toward the bottom of the fastener so that in an assembled position the taking up of a portion of the bow in the top provides resiliency within the structure. The top portion 72 also has an upstanding area with a recess therein which is provided so that a fastener inserting means such as a screw driver or coin may be utilized to assemble the structure. The bottom portion of the fastener is formed so as to have cam elements 74 on opposite sides thereof. These cam elements are formed so as to have a semicircular surface configuration.

Assembly

To assemble the single fill battery structure of this invention, the flapper 41 is first inserted into the case cover 12 of the battery by positioning the interconnecting webs 43 of the flapper in the notched-out portions 28 of the bearing support members 26 in the manner described previously. The locating members 49 of the flapper are positioned about the central one of the bearing support members 26 as shown in FIGURE 2 so as to achieve a precise location of the buttons 47 supported by the flapper relative to the air escapement vents 24 assoicated with each cell of the battery.

After assembly of the flapper 41, the camming member 51 is then assembled with the battery case cover 12. The member 51 is positioned so that the raised circular locating elements 58 on the particular spacing shaft 53 thereof are positioned on either side of the central bearing support member 26 in the aforedescribed manner. This locates the cams 52 in assoication with respective ones of the cam surfaces 44 assoicated with the upstanding portions 42 of the flapper 41.

The cover plate 66 is then inserted so that the edges thereof are received in the stepped-out area 38 of the battery case cover 12. In this condition the depending bearing support members 67 of the cover plate are associated with the bearing support members 26 of the case cover 12 so as to confine the spacing shafts of the camming member 51 for rotative movement. Also, splash guards 69 depending from the cover plate 66 are positioned relative to the splash guards 36 formed on the bottom wall 19 of the case cover 12 so that splashing of electrolyte from the battery cells is substantially reduced.

Each of the fasteners 71 is now inserted to secure the structure together and to place the structure in operative condition. More particularly each fastener 71 is inserted by first aligning the cam element 74 on the lower end thereof with an associated opening 68 in the cover plate 66. The fastener 71 is inserted partly in the opening 68 and then turned 90° to align the cam elements 74 thereof with the key shaped opening in the bottom portion 32 of the filler well 31. The fastener is inserted so that the lower portion thereof extends beyond the bottom portion of the filler well and then it is rotated 90° again whereby the cam elements 74 thereof, which have moved along the cam surfaces 33, are disposed in the circular notches 34. The fastener is then locked in position. The slight bow of the circular portion 72 of the fastener previously mentioned, permits a certain amount of resiliency in the structure which insures that each of the fasteners will be held with its cam elements 74 securely locked in the circular notches 34 until such time as it is desired to remove the same therefrom. When both of the fasteners 71 have been inserted and locked in their secured position, the single fill battery structure of this invention may be utilized.

Operation

The main function of the single fill battery structure of this invention is to permit the addition of fluid to all of the cells of the battery by the pouring of the fluid into a single opening in the battery. Such a structure allows an easy check and rapid service, insuring correct electrolyte level in all battery cells. The structure also encourages service station attendants to check and maintain proper electrolyte levels within the battery because of the reduced effort on their part in performing such operations.

In the description of the operation of the structure of this invention, it will be assumed that all of the components of the structure are in a nonoperative condition when the closure member 54 is in a position lying flat on the top surface 17 of the battery case cover 12 as is shown in FIGURES 3 and 5. The structure is in an operative condition when the closure member 54 is in an open position as shown in FIGURE 4.

When the closure member 54 is in its inoperative position, the bottom surface 61 of two of the cams 52 engage the backcams 48 assoicated with the flapper 41. This engagement maintains the flapper in such a position that the deformable buttons 47 thereof are spaced from assoicated ones of the air escapement vents 24.

When it is desired to add fluid to the cells of the battery, the closure structure 54 is moved to an operative position by inserting a finger in the recess portion 57 of the closure member and pivoting the member upwardly until it reaches a fully open position. As the closure member is rotated to an open position, the interconnecting web 56 rotates the camming member 51 through the same arc. As the camming member is rotated, the top surfaces 59 of the respective cams 52 are brought into engagement with the cam surfaces 44 assoicated with each of the upstanding portions 42 of the flapper. Also, during this rotation the bottom surface 61 of the two cams 52 which were engaging the backcams 48 are moved out of engagement with these elements.

As the top surface 59 of the respective cams 52 engage the cam surfaces 44, the flapper 41 is pivoted toward the plateaus 23 of the inclined wall 18 of the battery case cover 12. The top surfaces 59 of the cams 52 reach a final position as shown in FIGURE 4 wherein the deformable buttons 47 carried by the flapper 41 are brought into engagement with the air escapement vents 24 on the plateaus 23. More particularly, the cams 52, in their movement to the actuated position, pass over center and they apply a force to the flapper 41. Thus, the various deformable buttons engaging the air escapement vents 24 have sufficient pressure applied thereagainst that they are deformed as shown in FIGURE 4 thereby sealing the air escapement vents.

The single fill battery structure is now in a position such that a service station attendant may add fluid thereto. More particularly, since the various air vents 24 are sealed for each of the cells, fluid may be added to each cell until the fluid reaches the bottom of the filler well 31 extending into the cell. The filler well will then fill up but air will be entrapped in an air space 76 (FIGURE 3) above each cell. The entrapped air balances the pressure being applied to the cell by the column of fluid in the filler well thereby causing the fluid to overflow the well and proceed along the channel defined between the walls 18, 19 and 21 to the next well. At the next well the fluid again flows into the associated cell until an overflow of the cell occurs and a further displacement of the fluid then takes place along the path to the next cell. When all of the cells have been filled, then the attendant will notice a rise of fluid in the area of the first cell.

When the individual cells are filled, the attendant moves the closure structure 54 to its nonoperative position thereby causing the bottom surfaces 61 of the two cams 52 to once again engage the backcams 48 of the flapper 41 to move the deformable buttons of the flapper out of engagement with the air vents 24. Once the air vents 24 are unsealed, the fluid in the respective filler wells of the cells flows out into the cell to equalize itself throughout the cell and give the proper electrolyte fluid level within the cell.

Thus, the single fill battery structure of this invention permits an easy maintenance of the proper electrolyte level in all of the cells of the battery. The structure is easily operated for a rapid check and maintenance of the electrolyte levels within the various cells. The structure also encourages service station attendants to inspect and maintain the battery because of the ease with which the structure may be operated.

The invention disclosed will have many modifications which will be apparent to those skilled in the art in view of the teachings of this specification. It is intended that all modifications which fall within the true spirit and scope of this invention be included within the scope of the appended claims.

What is claimed is:
1. A single fill battery comprising:
   a battery case divided into a plurality of cells;
   a cover for closing said battery case and for sealing each of said cells so that each cell defines an individual compartment;
   the upper surface of said battery cover having a recess therein overlying the top of each of said cells;
   a plurality of filler wells and air escapement vents in said recess, one each of said wells and said vents being associated with and communicating with each of said individual cells, each of said filler wells extending within its associated cell and each of said air escapement vents communicating with its associated cell at a position above the position to which said filler well extends within said cell;
   a camming member;
   a flapper having deformable portions therealong, the spacing between said deformable portions conforming to the placement of respective ones of said air escapement vents in said recess;
   supporting means in said recess both for supporting said camming member for pivotable movement within said recess and for supporting said flapper for pivotable movement within said recess, said flapper being supported at a position between said camming member and said plurality of air escapement vents with said deformable portions of said flapper aligned with said air escapement vents; and
   means for actuating said camming member between first and second positions, said camming member when in said first position engaging said flapper so as to cause said deformable portions thereof to be moved into sealing engagement with said respective ones of said air escapement vents, and said camming member when in said second position not engaging said flapper whereby said deformable portions of said flapper are not in sealing relationship with said air escapement vents.

2. The single fill battery structure of claim 1 further comprising:
   a plate for covering the top of said recess of said battery case cover, said plate having a small opening therein;
   wherein said means for actuating said camming member includes a portion which both closes off said small opening of said plate when said camming member is in its second position and opens said small opening of said plate when said camming member is in its first portion; and
   whereby fluid may be added through said small opening to said recess in said battery case cover while said air escapement vents of the respective cells are closed off by said deformable portions of said flapper.

3. A single fill battery comprising:
   a battery case divided into a plurality of cells;
   a cover for closing said battery case and for sealing each of said cells so that each cell defines an individual compartment;
   the upper surface of said battery cover having a recess therein overlying the top of each of said cells, said recess being defined, in part, by a bottom wall and a sidewall, said sidewall having air escapement vents therein associated with individual ones of said cells, said bottom wall having filler wells therein extending downwardly therefrom into associated ones of said cells, said bottom wall further having bearing support members extending upwardly therefrom at spaced intervals therealong, said members also having a notch therein adjacent said sidewall;
   a camming member in the form of a shaft with a plurality of spaced cams therealong, said shaft having portions thereof received in said bearing support members;
   a flapper having portions thereof received in said notches of said bearing support members for pivotable movement, said flapper having both a plurality of cam surfaces aligned with said spaced cams of said camming member and a plurality of deformable buttons mounted at spaced intervals along the length thereof at positions adjacent said air escapement vents of said sidewall;

a plate for covering the top of said recessed portion of said battery cover, said plate having a plurality of downwardly projecting members defining bearing surfaces at spaced intervals along the length thereof identical to the spacing associated with said bearing support members projecting upwardly from said bottom wall of said recess;

means for attaching said plate to said battery cover so that said bearing surfaces of both said cover and said plate engage said shaft portions of said camming member to confine said camming member for rotative movement; and means attached to said camming member for rotating said camming member in said bearing surfaces whereby when said rotating means is in a first position, said cams engage said cam surfaces of said flapper and cause said deformable buttons to be moved into engagement with said air escapement vents thereby permitting fluid to be added to said cells to a level determined by the pressure build up of entrapped air within said cells and whereby when said rotating means is in a second position, said cams are moved out of engagement with said cam surfaces of said flapper so that said buttons of said flapper are not in engagement with said air escapement vents whereby said plurality of battery cells are vented.

4. The single fill battery defined in claim 3 wherein: said plate for covering the top of said recessed portion of said battery cover has a notch at one end thereof so that when said plate and said cover are assembled said plate does not overlie an end one of said filler wells; and wherein said means for rotating said camming member is formed at least partly by a closure member which overlies said notched-out portion of said plate to close off said one filler well when said rotating means is in its second position and to expose said one filler well when said rotating means is in its first position so that fluid may be poured through said notched-out portion of said plate and flow along said recess in the upper surface of said battery cover, in turn, into each of said cells of the battery when said air escapement vents are closed by said deformable buttons of said flapper.

5. The single fill battery defined in claim 4 wherein said means for attaching said plate to said battery cover comprises: cam defining surfaces on the lower portion of two of said filler wells extending into said cells; a pair of openings in said plate for covering said recessed portion of said battery cover, said opening being aligned with said two filler wells when said plate is positioned on top of said recessed portion of said cover; and a pair of fasteners extending through respective ones of said openings and into associated ones of said filler wells, said fasteners having both projecting portions on the lower part thereof which engage said cam defining lower surfaces of said two filler wells and flat head portions on the upper part thereof which engage the top of said plate to secure said plate to said battery cover.

6. A single fill battery comprising:
a battery case divided into a plurality of cells;
a cover for closing said battery case and for sealing each of said cells so that each cell defines an individual compartment;
the upper surface of said battery cover having a recess therein overlying the top of each of said cells, said recess being defined, in part, by a bottom wall and an inclined sidewall, said inclined sidewall having air escapement vents therein at spaced intervals therealong so that each of said escapement vents is associated with an individual one of said cells, said bottom wall having a plurality of filter wells therein each associated with and extending downwardly from said bottom wall into individual ones of said cells, two of said filler wells having cam defining surfaces on the lower portion thereof facing into said cells, said bottom wall further having bearing support members extending upwardly therefrom between adjacent ones of said vent wells, said bearing support members being perpendicular to said inclined wall and having a notch therein adjacent said inclined wall;

a camming member in the form of a shaft with a plurality of spaced cams therealong, said shaft having portions thereof received in said bearing support members and said cams therealong being adjacent individual ones of said air escapement vents of said inclining wall;

a flapper having portions thereof received in said notches of said bearing suport members for pivotable movement, said flapper having both a plurality of cam surfaces aligned with said spaced cams of said camming member and a plurality of deformable buttons mounted at spaced intervals along the length thereof at positions adjacent associated ones of said air escapement vents of said inclined wall;

a plate for covering the top of said recessed portion of said battery cover, said plate having a plurality of downwardly projecting members defining bearing surfaces at spaced intervals along the length thereof identcal to the spacing associated with said bearing support members projecting upwardly from said bottom wall of said recess, said plate also having a pair of openings therein alignable with said two filler wells having said cam defining surfaces thereon, and said plate further having a notched-out portion at one end thereof overlying an end one of said filler wells;

two fasteners for extending through respective ones of said openings in said plate and into associated ones of said filler wells of said battery cover, said fasteners having both projecting portions extending outwardly from the bottom end thereof for engaging said cam defining surfaces of said two filler wells and flat head portions on the upper part thereof for engaging the top of said plate to secure said plate to said battery cover; and means attached to said camming member and having a closure portion positioned in said notched-out portion of said plate, said means for rotating said camming member in said bearing support members whereby when said rotating means is in a first position wherein said closure member is not positioned in said notched-out portion of said cover, said cams of said camming member engage said cam surfaces of said flapper and press said deformable buttons into engagement with said air escapement vents of said individual cells thereby permitting fluid to be added to a level determined by the pressure build up within each of the cells, and whereby when said rotating means is in a second position wherein said closure member is positioned in said notched-out portion of said cover, said cams of said camming member are moved out of engagement with said cam surfaces of said flapper so that said deformable buttons of said flapper are not in engagement with said air escapement vents whereby said plurality of battery cells are vented.

7. The single fill battery defined in claim 6 wherein said flapper is constructed so that one of said plurality of cam surfaces is located on each side of each one of said deformable buttons; and wherein an associated one of said cams of said camming member extends between said two cam surfaces associated with an individual one of said buttons.

8. The single fill battery as defined in claim 7 further comprising: backcams on said flapper, said backcams extending from a point of attachment to said flapper located near the bottom wall of said recess of said cover in a direction generally away from said inclined sidewall to a terminal position underlying associated ones of said cams of said camming member so that when said camming member rotating means is moved from its first to its second position, said cam elements engage said backcams and move said flapper from its button engaging position to its nonbutton engaging position.

9. The single fill battery as defined in claim 8 further comprising: a plurality of splash guards formed partially around each of said filler wells and extending generally upwardly from the bottom wall of said recess of said cover, and a plurality of cooperating splash guards formed integrally with an dextending downwardly from said plate at spaced intervals along the length thereof associated with the spacing of said filler wells, said two sets of splash guards cooperating to reduce the amount of fluid which is discharged from said cells when said battery is subjected to shock or vibrations.

References Cited
UNITED STATES PATENTS

| | | | |
|---|---|---|---|
| 2,506,952 | 5/1950 | Doughty. | |
| 2,629,760 | 2/1953 | Wells et al. | 136—177 |
| 3,218,198 | 11/1965 | Havlick | 136—170 |

WINSTON A. DOUGLAS, Primary Examiner

J. L. WALTON, Assistant Examiner

U.S. Cl. X.R.

136—170, 177